US009240121B2

(12) United States Patent
Banerjee et al.

(10) Patent No.: US 9,240,121 B2
(45) Date of Patent: *Jan. 19, 2016

(54) DETERMINING ALERT CRITERIA IN A NETWORK ENVIRONMENT

(71) Applicant: International Business Machines Corporation, Armonk, NY (US)

(72) Inventors: Biswadeep Banerjee, Bangalore (IN); Mikael Lindstrom, Stockholm (SE); Shahbaz A. Shaik, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,966

(22) Filed: Sep. 5, 2014

(65) Prior Publication Data
US 2015/0325105 A1    Nov. 12, 2015

Related U.S. Application Data

(63) Continuation of application No. 14/270,499, filed on May 6, 2014.

(51) Int. Cl.
G08B 29/00    (2006.01)

(52) U.S. Cl.
CPC ..................... G08B 29/00 (2013.01)

(58) Field of Classification Search
CPC ......... G06F 11/3055; H04L 1/00; H04W 4/00
USPC ............. 340/506, 539.1, 3.43, 13.24, 286.02; 370/241; 709/223
See application file for complete search history.

(56) References Cited

U.S. PATENT DOCUMENTS

| | | | |
|---|---|---|---|
| 7,113,988 B2* | 9/2006 | Chirashnya et al. | 709/224 |
| 7,225,103 B2 | 5/2007 | Beresniewicz et al. | |
| 7,702,782 B1 | 4/2010 | Pai | |
| 8,019,849 B1 | 9/2011 | Lopilato et al. | |
| 8,032,621 B1* | 10/2011 | Upalekar et al. | 709/223 |
| 8,086,708 B2 | 12/2011 | Breitgand et al. | |
| 8,095,938 B1* | 1/2012 | Xie et al. | 719/318 |
| 8,594,977 B2* | 11/2013 | Laberge et al. | 702/184 |
| 2005/0015624 A1* | 1/2005 | Ginter et al. | 713/201 |

OTHER PUBLICATIONS

Bhatia, Neeraj, "Proactive Detection of Performance Problems using Adaptive Thresholds", provided in search results dated Nov. 14, 2013.

Gottilla, Daniel, "The Advantage of Using Automated Alerts", provided in Main Idea of Disclosure dated Dec. 3, 2013, <http://ezinearticles.com/?The-Advantage-of-Using-Automated-Alerts&id=2736893>.

IBM, "Adaptive Monitoring (Dynamic Thresholding) Automation Solution", Version 1.0, Last Updated Dec. 17, 2008, <https://www-304.ibm.com/jct01003c/software/brandcatalog/ismlibrary/details?catalog.label=1TW1OTM7F>.

(Continued)

Primary Examiner — Phung Nguyen
(74) Attorney, Agent, or Firm — Stephen R. Yoder

(57) ABSTRACT

Alert conditions datasets are created from historic data taken from actual incidents for which the alert condition datasets are to indicate during future operations. A networked computers system including various devices is monitored for alert conditions associated with one, or more, of the devices. The severity of an alert is based on the number of alert conditions met for a given alert conditions dataset.

5 Claims, 6 Drawing Sheets

(56) References Cited

OTHER PUBLICATIONS

IBM, "Situation overrides for dynamic thresholding", IBM Tivoli Monitoring, Version 6.2.2 Fix Pack 2, provided by inventor in post disclosure dated Oct. 23, 2013, <http://publib.boulder.ibm.com/infocenter/tivihelp/v15r1/topic/com.ibm.itm.doc_6.2.2fp2/situation_overrideintro_tep.htm>.

IBM, "Tivoli Monitoring for Virtual Environments", provided by inventor in post disclosure dated Oct. 23, 2013, <http://www-03.ibm.com/software/products/en/tivomoniforvirtenvi>.

Lambert et al., "Adaptive Thresholds: Monitoring Streams of Network Counts", © 2006 American Statistical Association, Journal of the American Statistical Association, Mar. 2006, vol. 101, No. 473, Applications and Case Studies, DOI 10.1198/016214505000000943, pp. 78-88.

"dynamic-threshold", SolarWinds.com site search, © 2003-2014 SolarWinds, <http://www.solarwinds.com/search/dynamic-threshold.aspx>.

"EMC Storage Analytics Extending Analytics fo the Storage Domain", © 2013 EMC Corporation, Published in the USA, Aug. 2013 Data Sheet H11853.1.

"6 Monitoring Performance Alerts", Oracle® Database 2 Day + Performance Tuning Guide, 12c Release 1 (12.1), <http://docs.oracle.com/cd/E24628_01/server.121/e17635/tdppt_alerts.htm>, Copyright © 2007, 2013, Oracle and/or its affiliates.

"Proactive Monitoring, Auto Thresholding and Correlation using the eG Alarm Manager", <http://www.eginnovations.com/web/egalarm-manager.htm>, © 2014 eG Innovations.

"SCOM: How Self-Tuning Threshold Baseline is Computed", provided by inventor in post disclosure dated Oct. 31, 2013, <https://social.technet.microsoft.com/wiki/contents/articles/237.scom-how-self-tuning-threshold-baseline-is-computed.aspx>.

U.S. Appl. No. 14/270,499, entitled "Determining Alert Criteria in a Network Environment", filed May 6, 2014.

Appendix P: List of IBM Patents or Patent Applications Treated as Related, dated Sep. 12, 2014, 2 pages.

Breitgand et al., "Automated and Adaptive Threshold Setting: Enabling Technology for Autonomy and Self-Management", Proceedings of the Second International Conference on Autonomic Computing (ICAC'05), Jun. 13-16, 2005, pp. 204-215, IEEE.

\* cited by examiner

DETERMINING ALERT CRITERIA IN A NETWORK ENVIRONMENT

FIELD OF THE INVENTION

The present invention relates generally to the field of event notification, and more particularly to determining alert criteria.

BACKGROUND OF THE INVENTION

In an organization there are incidents recorded where a device or a service becomes unresponsive, inhibited, unreachable, and so on, which can hamper the operations of the organization. In most of the cases, actions such as root cause determination, rebooting the computer system, and/or collecting system dump data is taken after an incident has occurred.

In a storage area network (SAN), a storage resource management (SRM) program collects data from various devices and/or component of a computer system. The data collected includes current and historical performance metrics and device details. The SRM program raises alerts based on the threshold values set for a particular metric for a particular device. The alerts are raised once the actual value of the metric for the particular device or system component meets the threshold condition set by a user.

SUMMARY

Embodiments of the present invention disclose a method, computer program product, and system for determining alert criteria based on network conditions that existed during a previous incident. A first computer system determining a time range for a first instance of an incident in a computer system. The first computer system collecting conditions of at least one component of the computer system. The first computer system deriving a set of alert conditions for the incident from the collected conditions. The existence of the incident inhibits functionality of the at least one component of the computer system. The collected conditions were present during the time range. At least the collecting and deriving steps are performed by computer software running on computer hardware.

DETAILED DESCRIPTION

Figure 1:
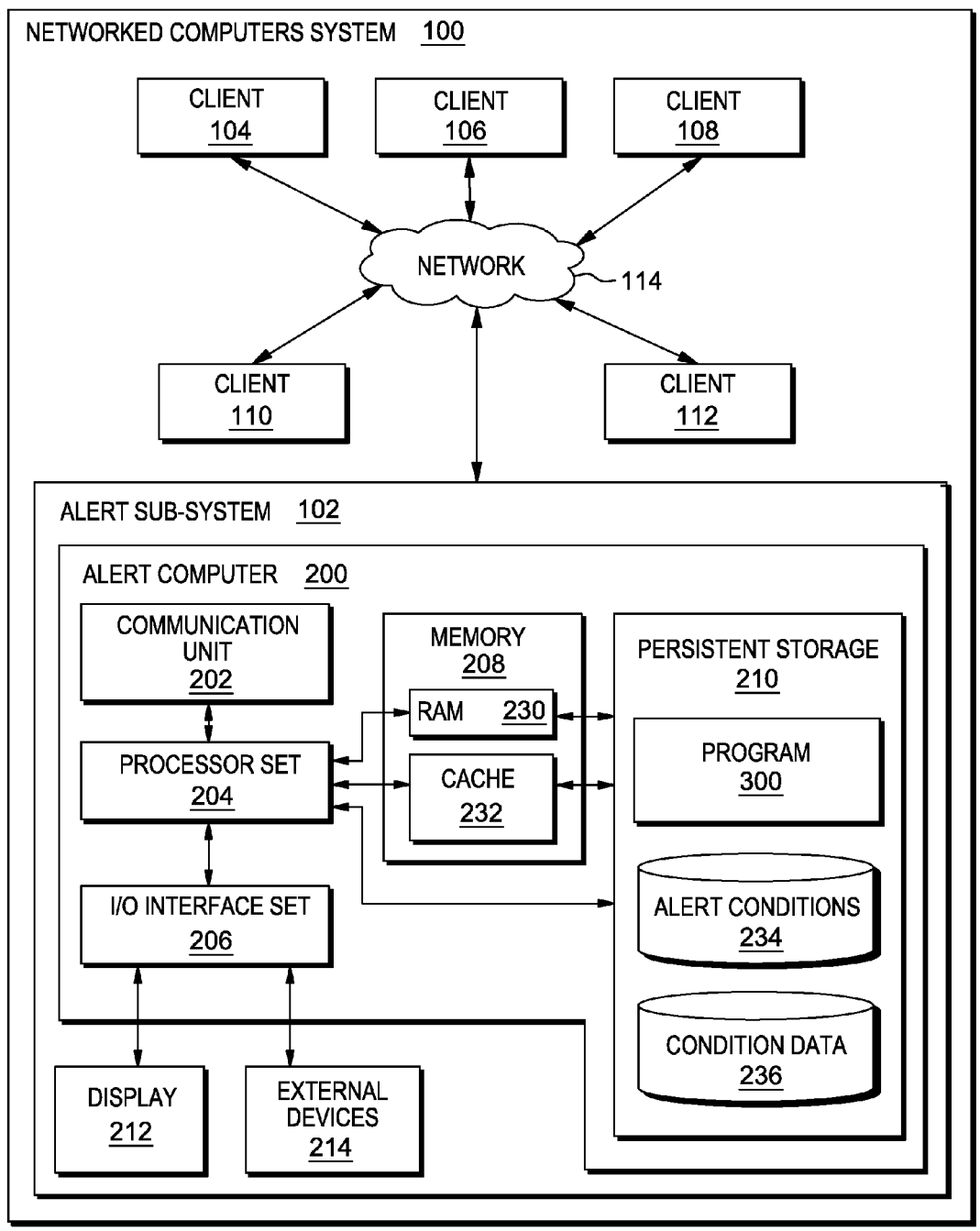
FIG. 1 is a schematic view of a first embodiment of a system according to the present invention.

Alert conditions datasets are created from historic data taken from actual incidents for which the alert condition datasets are to indicate during future operations. A networked computers system including various devices is monitored for alert conditions associated with one, or more, of the devices. The severity of an alert is based on the number of alert conditions met for a given alert conditions dataset. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a networked computers system, generally designated 100, in accordance with one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: alert sub-system 102; client sub-systems 104, 106, 108, 110, 112; communication network 114; alert computer 200; communication unit 202; processor set 204; input/output (I/O) interface set 206; memory device 208; persistent storage device 210; display device 212; external device set 214; random access memory (RAM) devices 230; cache memory device 232; program 300; alert conditions repository 234; condition data store 236.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In some embodiments, network 114 is a storage area network (SAN) and client sub-systems, such as client sub-system 104, are storage resources. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Alert conditions repository 234 is a data store that includes substantive data in a form that program 300 reads as-needed to support its alert function. In this embodiment, alert conditions repository 234 is a relational database.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to monitor system components of a computing system, such as those shown in alert sub-system 102, for alert conditions associated with previously encountered incidents. The term "system components," as used herein, refers to one, or more, of the following: (i) hardware; (ii) software; and (iii) a combination of hardware and software. In addition to monitoring for alert conditions, program 300 automatically creates alert condition datasets and reports identified incidents and their severity according to the percentage of alert conditions within the alert conditions dataset that are met during operation of the system.

Some embodiments of the present invention recognize the following facts, potential problems and/or potential areas for improvement with respect to the current state of the art: (i) typically, incidents which result in a failure are not just based on a particular device or its component; (ii) the affect of the failure reaches across the devices, though the root cause can be isolated to a single device or a component of a device; (iii) users would like to set the alert requirements properly so that they are alerted early about a possible incident; (iv) alerts raised in an SRM system do not predict or warn of major incidents because the alerts work independent of other triggering conditions; (v) even if a set of thresholds is established for various alerts, it will be highly unlikely to predict the exact state of the environment during the time of a failure incident because it is very difficult for humans to establish the thresholds to predict the state of different devices in an event of an incident; (vi) although management software solutions provide for setting thresholds, the threshold alerts act independently of other thresholds being met; and/or (vii) conventional threshold alerts are based on an associated metric and/or a state of a particular device or system component (for example, if there is a threshold value set on a port of a device, the corresponding alert arises only if the actual value is greater than or less than the threshold value, but this alert is limited to a port of a particular device).

To capture metrics and states of network devices during a particular incident, a user provides a time range for which the incident took place including, for example: (i) start time and date of the incident; and (ii) end time and date of the incident. Alternatively, a system monitoring program determines the start time and end time of an incident. The values of various metrics during the event are compared to the values just prior to the event to identify a set of relevant metrics, or alert condition data. The relevant metrics are those metrics having the most variance between the value identified in the collected condition data during the incident and the value of the respectively corresponding condition data just before the incident. That is, the metric and state values that demonstrate a variance are, in fact, the values for the various components of the computers system during the time of the incident.

Based on these inputs, program 300 creates alerting criteria in the form of an alert conditions dataset, representing the states of different devices and their respective performance data over the specified time range of an incident. The alert conditions dataset is created to alert the user of a possibility of incident recurrence. In this embodiment, the alert conditions dataset is added to alert conditions repository 234 for targeting the recurrence of other incident(s) that have occurred. Each set of alert conditions data that is stored in the alert conditions repository acts to notify a user of a possible past incident recurrence. Each set of alert conditions data identifies the specific metric(s) and/or state(s) of device(s) during the specified time range of each incident.

Some embodiments of the present invention provide various degrees of incident alerts. For example, when an alert program identifies a five-condition pattern over a specified time range for Incident A, it may create five distinct alerts for that incident. Each alert condition dataset is based upon one, or more, alert conditions related to device performance and/or device state. Each alert condition may be assigned a weight. Based on the weight for each condition, the user takes varying corrective actions. Multiple triggers of alert conditions in an alert conditions dataset for an incident, alerts the user that the network environment is following closely to a pattern of conditions that were associated with that incident. Meeting all the alert conditions in an alert condition dataset triggers an alert of the high possibility for incident recurrence.

Figure 2:
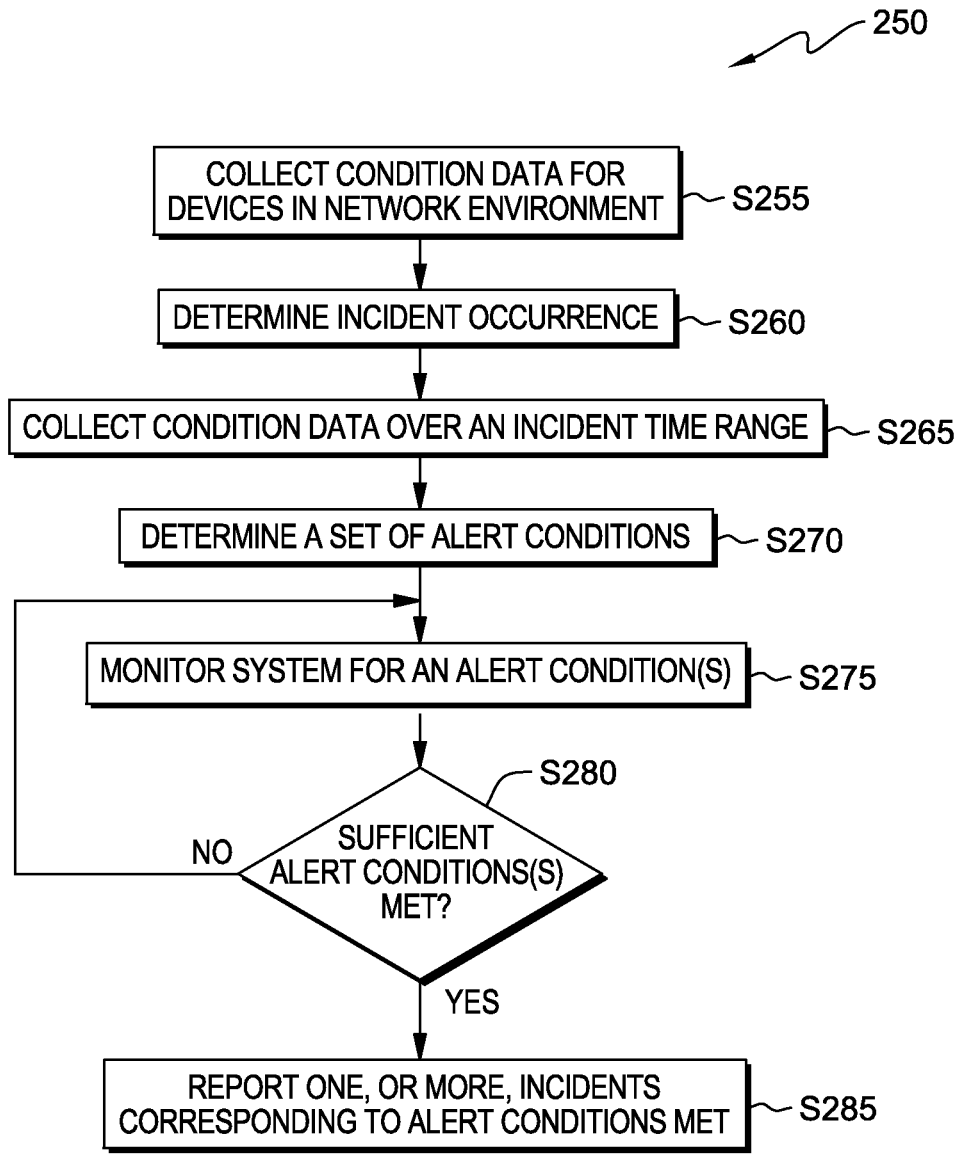
FIG. 2 is a flowchart showing a method performed, at least in part, by the first embodiment system.
Figure 3:
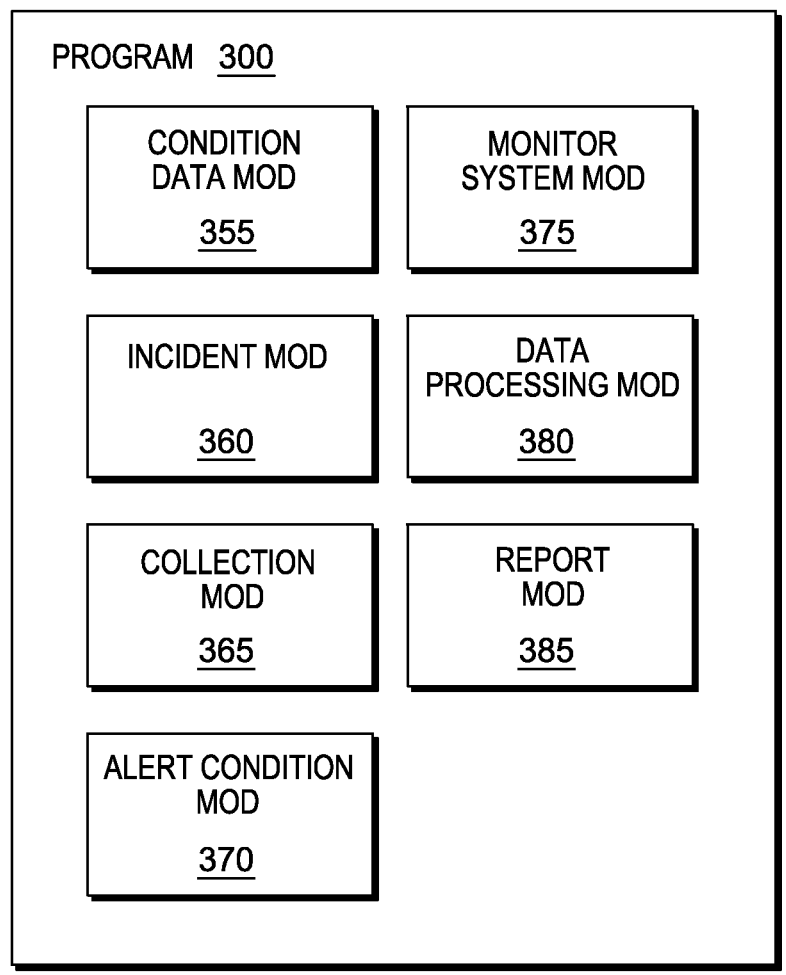
FIG. 3 is a schematic view of a machine logic (for example, software) portion of the first embodiment system.
Figure 4:
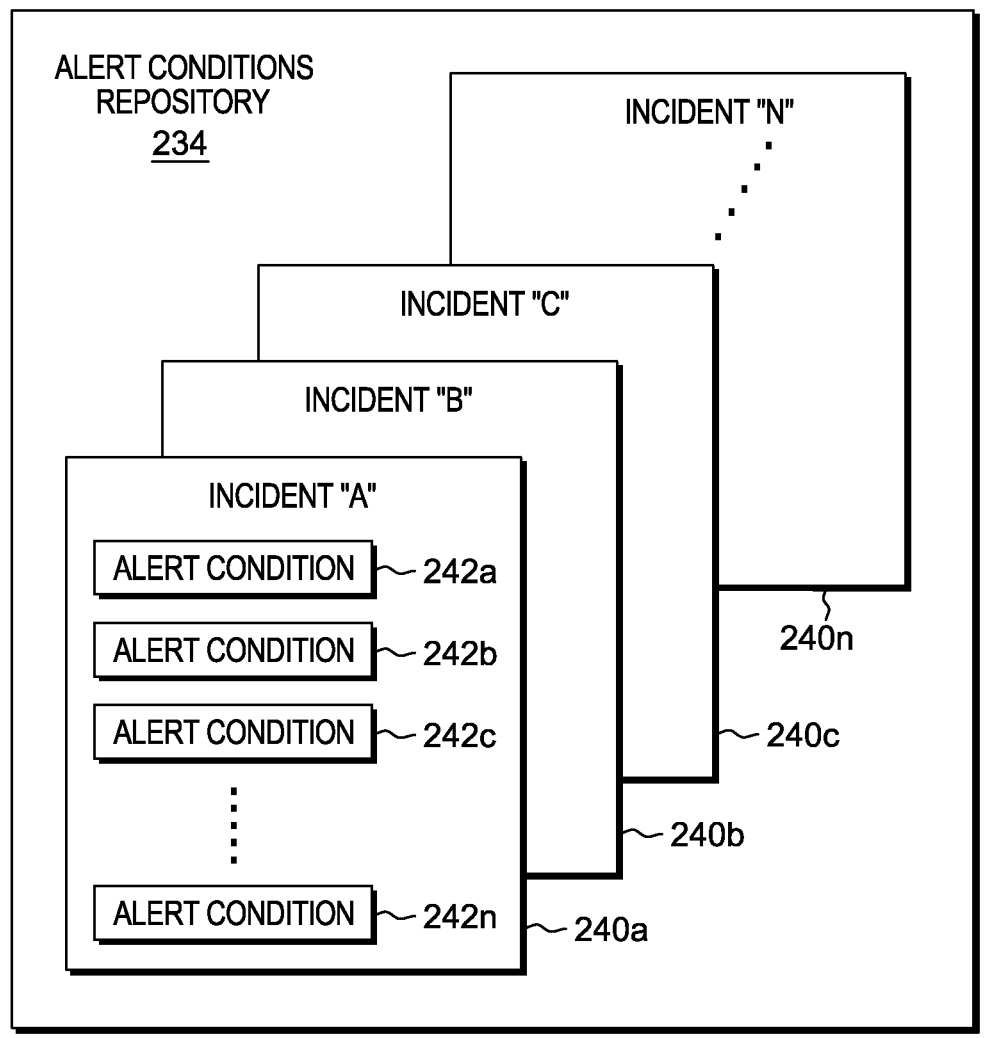
FIG. 4 is a schematic view of a machine logic (for example, software) portion of the first embodiment system.

FIG. 2 shows flowchart 250 depicting a first method according to the present invention. FIGS. 3 and 4 show program 300 and corresponding software modules for performing at least some of the method steps of flowchart 250. This method and associated software will now be discussed, over the course of the following paragraphs, with extensive reference to FIG. 2 (for the method step blocks) and FIGS. 3 and 4 (for the software blocks).

Processing begins at step S255, where condition data module 355 collects condition data for devices in networked computers system 100. Data collected may include, and is not limited to: (i) data rates; (ii) I/O rates; (iii) response times; (iv) transfer rates; (v) port send I/O rate; (vi) port receive I/O rate; (vii) read data rate; (viii) write response time; (ix) total transfer size; (x) number of volumes; (xi) number of disks; (xii) volume capacity; (xiii) used capacity; (xiv) free capacity; (xv) system status; (xvi) is detectable; (xvii) vendor; (xviii) model; (xix) component type; (xx) operational status; (xxi) SQL service response time; (xxii) response time per transaction; (xxiii) user transaction rate; (xxiv) redo generated rate; (xxv) network traffic volume rate; (xxvi) current logons count; (xxvii) execution rate; (xxviii) logical reads per transaction; (xxix) buffer cache hit ratio; and/or (xxx) user commits rate. In this embodiment, collected data is timestamped and stored in conditions data store. In some embodiments, a storage duration is established for storing condition data because only conditions data collected a relatively short period before an incident start time is used by program 300. Alternatively, condition data storage is limited in size and time, such that condition data is stored in RAM, or cached.

Processing proceeds to step S260, where incident module 360 determines an incident occurrence. In this embodiment, an incident occurrence is determined by the input by a user of an incident start time and end time, referred to herein as the "incident time range." Alternatively, the incident module determines an incident, and corresponding incident time range, by communicating with a commercially available system monitoring program (not shown). Each incident that is determined is assigned a unique identifier and associated with a file in alert conditions repository 234.

Processing proceeds to step S265, where collection module 365 collects condition data stored by condition data module 355 over the incident time range identified in step S260. In this embodiment, condition data is collected such that it is available over the incident time range and for a period of time prior to the start time of the incident. Alternatively, condition data is stored for a pre-determined period of time that may only include a portion of the incident time range.

Processing proceeds to step S270, where alert condition module 370 determines a set of alert conditions. The set of alert conditions is determined by comparing the values of the collected conditions during the incident with corresponding values of baseline conditions during system operation (see below for a definition of baseline conditions). For example, alert conditions dataset 240a is a set of alert conditions, 242a, 242b, 242c, to 242n, associated with the file, Incident A, in alert conditions repository 234. In this embodiment, the baseline conditions are determined during a period of time before the start of the incident. The number of baseline conditions depends on the amount of storage space available. Alternatively, baseline conditions data is collected just after the end time of the incident. Alternatively, baseline conditions data is retrieved from a set of fixed system specifications. Alternatively, baseline conditions data is collected periodically and stored in conditions data store 236, replacing any existing baseline conditions data.

Processing proceeds to step S275, where monitor system module 375 monitors networked computers system 100 for one, or more alert conditions (such as conditions 242a, 242b, etc.) in alert conditions repository 234. Each alert condition is associated with one, or more, incident files 240a, 240b, 240c, to 240n (for Incidents A though N).

Processing proceeds to decision step S280, where data processing module 380 determines whether or not sufficient alert conditions are met to report a corresponding incident. If insufficient alert conditions are met, processing returns to step S275, where monitor system module 375 continues to monitor networked computers system 100. When sufficient alert conditions are met, processing proceeds to step S285.

Processing proceeds to step S285, where report module 385 reports one, or more incidents corresponding to the alert conditions that are met. For example, alert condition 242a and 242c may be associated with both alert conditions datasets 240a and 240b. If data processing module 380 is programmed to find that identifying any two alert conditions occurring in the network is sufficient, then report module reports the possible occurrence of both Incident A (alert condition dataset 240a) and Incident B (alert condition dataset 240b).

Described below are exemplary implementation details for dynamically determining priority criteria for alert conditions in a storage area network (SAN) environment based on condition data collected during past incidents.

Figure 5:
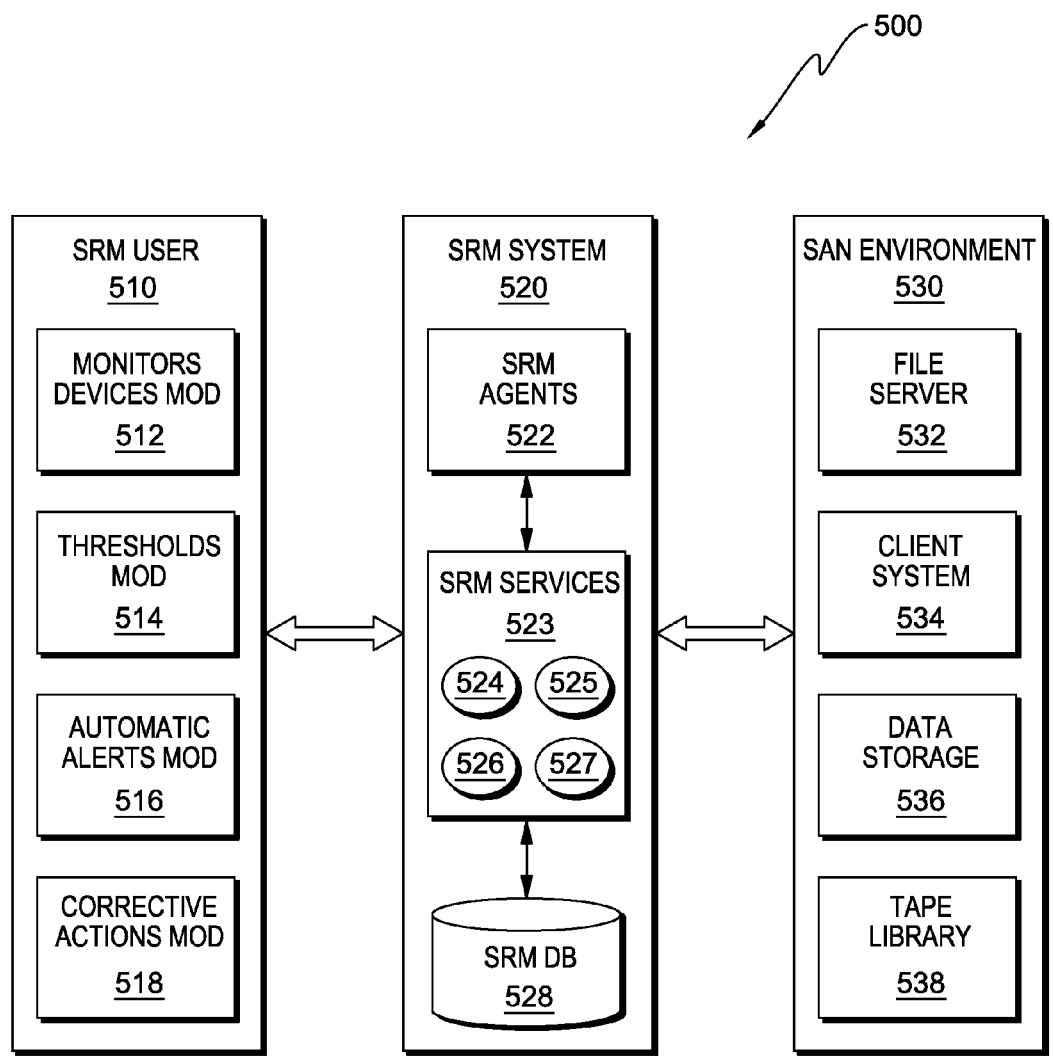
FIG. 5 is a schematic view of a machine logic (for example, software) portion of a networked computers system according to an embodiment of the present invention.

FIG. 5 depicts system diagram of storage resource management (SRM) system 500 including corresponding SAN 530 according to an embodiment of the present invention. SRM system 500 includes: SRM user program 510, monitor devices module 512, thresholds module 514, automatic alerts module 516, corrective actions module 518, SRM system components 520, SRM agents 522, SRM services program 523, device management module 524, data management module 525, alert management module 526, replication management module 527, SRM data store 528, SAN environment 530, file server 532, client computer system 534, data storage devices 536, and tape library 538.

SRM user program 510 collects data from different devices/components (see 532, 534, 536, 538) at regular intervals as monitor device module 512 monitors the SAN environment. The intervals may be small, for example five minutes. The various pieces of data collected by the SRM use programs that are stored onto relational database 528. The data stored in DRM database 528 is timestamped. The data collected for the various devices is broadly divided into one, or more, of the following areas: (i) data rates; (ii) I/O rates; (iii) response times; and/or (iv) transfer rates. Categories of metrics include, but are not limited to: (i) port send I/O rate; (ii) port receive I/O rate; (iii) read data rate; (iv) write response time; and/or (v) total transfer size. There are many metrics within each of the categories for each of the various devices.

Along with performance metrics, discussed above, SRM program 510 collects capacity metrics, such as: (i) number of volumes; (ii) number of disks; (iii) volume capacity; (iv) used capacity; and/or (v) free capacity. The SRM program also collects status information and property information of the various devices including: (i) system status; (ii) is detectable; (iii) vendor; (iv) model; (v) component type; and/or (vi) operational status.

Thresholds module 514 operates to create incident alerts based on information collected by SRM program 510. Exemplary implementation details for dynamic incident alerts creation follows. A detailed description of the alert creation process is provided with reference to FIG. 5. When prompted by a user, thresholds module 514 retrieves collected condition data for a selected device in SAN environment 530 from SRM database 528 for a specified time, or date, range. The thresholds module creates thresholds for the collected metrics based on the average value of each metric over the specified time range. For example, if the threshold module has collected data five different times during the time range provided, the values of the data rate metric, "Metric 1," for the specified device, "Subsystem Device 3," may be "40, 55, 70, 55, and 60." Accordingly, the threshold for Metric 1 is the average of the collected values. That is, the threshold value for Metric 1 is 56. In this example, the range set for the metric is plus or minus five percent. So, the threshold range for Metric 1 of Subsystem Device 3 is 53.2 to 58.8. This exemplary approach is taken for each of the conditions making up the alert conditions dataset.

Once the threshold value(s) for each of the conditions is determined, automatic alerts module 516 creates categories of the alert conditions. For example, the alert thresholds for the category "Data Rates" for device "Subsystem Device 3" are recorded for a specified incident, such as "Incident on 04Feb2013." Similarly, alert thresholds are set for the category, "Response Time," and so forth. The thresholds set are specifically determined for the event occurring during the time range provided. Corrective action module 518 operates to determine a corrective action based on the severity of the incident. An alert's severity is based, at least in part, on the number of categories of alert conditions that are triggered. For example, if there are four categories of alert conditions set for each of the metric type (Data Rate, Response Time, I/O Rate and Transfer Rate). When a condition for only one metric type triggers an alert, there is a low severity, or likelihood of a recurring incident. However, if all of the categories of metrics within an alert condition dataset trigger an alert at a particular time, the alert has a high severity, or high likelihood that the corresponding incident is recurring. Corrective actions module 518 takes corrective actions based on the severity of the alerts raised from the automated alert conditions dataset. In this embodiment, the corrective actions module operates to provide the user with sufficient notice to take preventive actions in averting a possible recurrence of the past incident. Alternatively, the corrective actions module determines a corrective action based on pre-determined actions according to the severity of the alert received.

Figure 6:
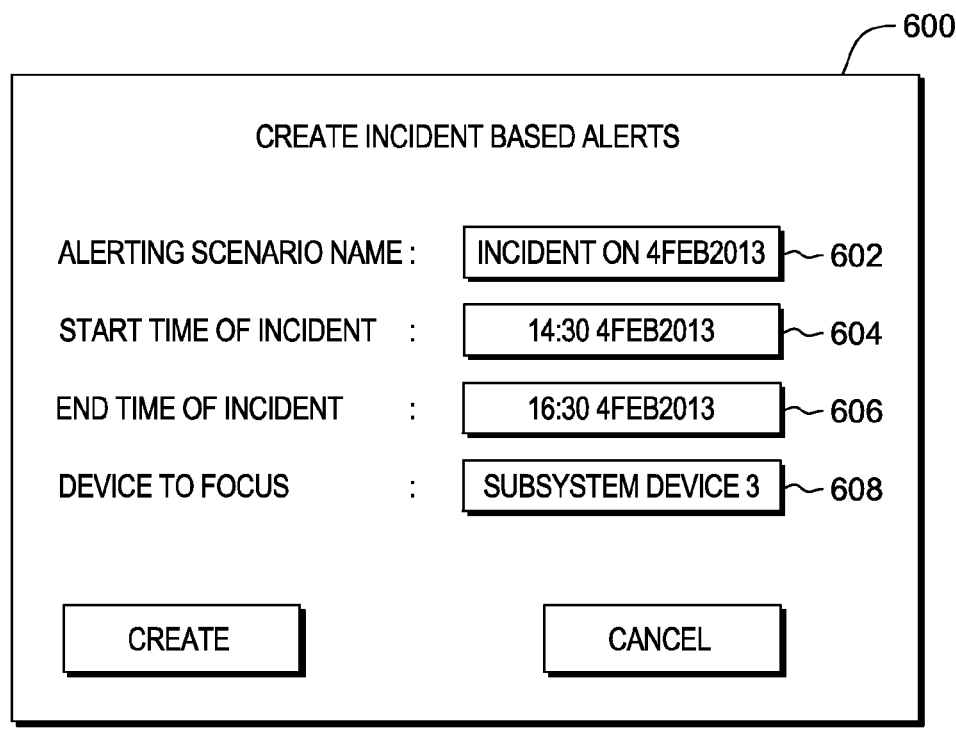
FIG. 6 is a screenshot view generated by the machine logic portion shown in FIG. 5.

FIG. 6 depicts screenshot 600 for creating incident-based alerts. In this embodiment, an incident-based alert is created by a user via the user interface depicted in FIG. 6. The user names the set of alert conditions in field 602 and enters the range of time over which the condition data is to represent in fields 604 (start time) and 606 (end time). In this embodiment, a target device is prompted for in field 608. Alternatively, no target device is provided.

The following example illustrates how multiple metrics are required to adequately alert a possible recurrence of the past incident. An SVC (Vitualizer) is connected to a DS8K (Subsystem with disks/storage) via a network switch. During the time period of the incident, the system identifies that the VDisk of SVC (VDisk1) has 1000 IOs/second. Further, the SVC has a Port Send Data Rate (for a particular port) with higher bits transferred/per second compared to the time prior to the start time of the incident. During the same time range as the incident, DS8K shows very slow Write Response Time for the volume "Vol3." Also, a switch's "Port 5" shows that there is a huge Transfer Rate during the same time range as the incident.

The above conditions are identified as variants forming an alert condition dataset by threshold module 514 (see FIG. 5). These four metrics are used to generate an alert condition dataset including: (i) I/O Rate metrics on SVC for the identified VDisk; (ii) Port Send Data Rate for the same SVC for the given port; (iii) Write Response Time for the volume Vol3 on DS8K system; and (iv) Transfer Rate of the Switch's port5.

All four metrics are identified with their respective values to create an alert condition dataset. When these alert conditions are met again, an alert will be raised to possibly avert a recurrence of the represented incident.

Some embodiments of the present invention may include one, or more, of the following features, characteristics and/or advantages: (i) captures the states and metrics of different devices in an event of an incident; (ii) uses the captured states and metrics to avert a possible recurrence of the incident; (iii) using alert conditions datasets to identify possible recurrences of incidents; (iv) multiple degrees of an alert are available to avoid a recurrence of an incident; (v) generates automatic alerts based on the collected conditions from past incidents' time range, which is provided by the user; (vi) averts a possible recurrence of the past incidents; (vii) automated alerts tuned to function more efficiently than alerts set by users; (viii) alerts function according to multiple metrics; (ix) alert conditions are met according to the state of one or more devices; (x) alerts are specific to the metrics and/or state that causes the incident to occur, which is likely unique to a particular customer system; (xi) captures the state of the monitored system and defines the alert conditions based on the values of relevant metrics from the provided time range; (xii) automated definition of alert condition datasets; (xiii) sets alert condition values based on a relatively small historical dataset; (xiv) stores alert conditions dataset in an alert conditions database to monitor a system for repetition of entire incident; (xv) stores alert conditions dataset in an alert conditions database to monitor a system for repetition of system state conditions; and/or (xvi) creates the basis for generating alerts.

It should be recognized by those skilled in the art that the above exemplary embodiments directed to an SAN environment may be equally applied to other computer networks such as those described herein and illustrated in FIG. 1.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Dataset: a set of one, or more, pieces of component, device, and/or system information including status and/or performance data.

Baseline conditions: conditions actually existing, expected to exist, or not existing during a period of time around the occurrence of a first alert condition indicating an incident. For example, the period of time may be a brief period before the occurrence of the first alert condition and/or a brief period after the incident occurs. Where conditions expected to exist are part of the baseline conditions, the conditions are retrieved from a set of system specifications.

The claims are as follows:

1. A method comprising:
    collecting a set of baseline conditions for at least one system component during operation of a computer system when no existence of alert conditions are identified;
    determining a time range for a first instance of an incident in the computer system;
    collecting a set of collected conditions of at least one component of the computer system; and
    deriving a set of alert conditions for the incident from the set of collected conditions;
    wherein:
    existence of the incident inhibits functionality of the at least one component of the computer system;
    the set of collected conditions were present during the time range; and
    at least the collecting and deriving steps are performed by computer software running on computer hardware.

2. The method of claim 1, further comprising:
    monitoring the at least one component of the computer system for the existence of an alert condition included in the set of alert conditions; and
    responsive to identifying existence of the alert condition in the at least one component of the computer system, generating an alert of a second instance of the incident.

3. The method of claim 2, wherein the alert indicates a percentage of alert conditions included in the set of alert conditions that are identified as existing in the at least one component of the computer system.

4. The method of claim 1, wherein the step of deriving the set of alert conditions for the incident from the collected conditions further includes:
    comparing the set of collected conditions to the set of baseline conditions.

5. The method of claim 1, wherein the step of deriving the set of alert conditions for the incident from the set of collected conditions further includes:
    selecting from the set of collected conditions the set of alert conditions based, at least in part, on a pre-determined variance between a value of a condition in the set of collected conditions and a corresponding value of a condition in the set of baseline conditions.

* * * * *